(12) United States Patent
Khan et al.

(10) Patent No.: US 8,487,959 B1
(45) Date of Patent: Jul. 16, 2013

(54) GENERATING SIMULATED EYE MOVEMENT TRACES FOR VISUAL DISPLAYS

(75) Inventors: Rehan Khan, Albany, CA (US); Nicholas Chamandy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 470 days.

(21) Appl. No.: 12/852,173

(22) Filed: Aug. 6, 2010

(51) Int. Cl.
*G09G 5/00* (2006.01)
(52) U.S. Cl.
USPC .......................... 345/619; 345/664; 345/679
(58) Field of Classification Search
None
See application file for complete search history.

(56) References Cited

U.S. PATENT DOCUMENTS

2010/0226564 A1* 9/2010 Marchesotti et al. ......... 382/159
2010/0295774 A1* 11/2010 Hennessey .................... 345/156

OTHER PUBLICATIONS

Nicholas Chamandy et al., "Simulated Eye Tracking Maps for Evaluation of Visual Displays," IMS Annual Meeting, Gothenburg, Aug. 13, 2010, 1 page.
Georg Buscher et al., "What do you See When You're Surfing? Using Eye Tracking to Predict Salient Regions of Web Pages," CHI 2009, Apr. 4-9, 2009, Boston, Massachusetts, 10 pages.
Kuansan Wang et al., "Interffing Search Behaviors Using Partially Observable Markov (POM) Model," WSDM[T]10, Feb. 4-6, 2010, New York City, New York, pp. 211-220.

* cited by examiner

*Primary Examiner* — Kee M Tung
*Assistant Examiner* — Leon T Cain, II
(74) *Attorney, Agent, or Firm* — Fish & Richardson P.C.

(57) ABSTRACT

Methods, systems, and apparatus, including computer programs encoded on a computer storage medium, for receiving a baseline resource and one or more candidate change resources at a computing device, the baseline resource and the one or more candidate resources being displayable on a display, rendering the baseline resource as an image to provide an image file including corresponding image data, rendering the one or more candidate change resources as respective images to provide one or more image files each including corresponding image data, processing the image files using the computing device to determine one or more statistics of interest, the one or more statistics of interest reflecting a user behavior in interacting with a resource.

19 Claims, 4 Drawing Sheets

GENERATING SIMULATED EYE MOVEMENT TRACES FOR VISUAL DISPLAYS

This specification relates to generating simulated eye movement traces for visual displays, and more particularly to evaluating user interactions with a visual display based on simulated eye traces.

BACKGROUND

The design and format of visually displayed information influences the behavior of users viewing the displayed information (e.g., how the user interprets and interacts with the information). Visual display documents, such as a web page, may undergo several design, layout, and/or format changes before and after publication. For example, web documents, such as search engine results pages (SERPs) are regularly updated in an effort to improve usability. For example, a SERP may be updated to incorporate new features and/or to improve its aesthetic appearance. When making such changes, it is often difficult to predict how user interaction with the page will be affected. For example, seemingly minor changes may have significant effects on measures of user behavior, including, for example, patterns of eye movements, clicks on objects on the web page, mouse movements, and key strokes. Such effects can be evaluated through usability studies, laboratory eye tracking studies, and live experiments on segments of traffic utilizing a modified version of the web page. Usability and laboratory eye tracking studies can be expensive and are of low statistical power. Live experiments on segments of traffic can also be expensive.

SUMMARY

According to one innovative aspect of the subject matter described in this specification, may be embodied in methods that include the actions of receiving a baseline resource and one or more candidate change resources at a computing device, the baseline resource and the one or more candidate resources being displayable on a display, rendering the baseline resource as an image to provide an image file including corresponding image data, rendering the one or more candidate change resources as respective images to provide one or more image files each including corresponding image data, processing the image files using the computing device to determine one or more statistics of interest, the one or more statistics of interest reflecting a user behavior in interacting with a resource.

These and other implementations may each optionally include one or more of the following features. For instance, the actions further include generating salience maps based on the images, generating simulated eye traces based on the salience maps, and generating maps based on the simulated eye traces, the one or more statistics of interest being determined based on the maps; wherein generating salience maps includes computing a plurality of salient features corresponding to each of a plurality of fixation location targets of each of the images, the computing being based on one or more of a local contrast, a spatial frequency of the targets and a number and distribution of potential targets; wherein the simulated eye traces each include a sequence of saccades provided as fixation points, each saccade including a coordinate and a fixation duration; wherein generating simulated eye traces includes determining a starting fixation point, and determining a subsequent fixation point based on statistical distribution data, an eye trace being defined between the starting fixation point and the subsequent fixation point; wherein the statistical distribution data includes empirical distribution data; wherein the statistical distribution data includes parametric distribution data; wherein the subsequent fixation point is determined based on a salience score within a region of a candidate fixation point, the candidate fixation point being identified as the subsequent fixation point when the salience score is greater than a threshold salience score; wherein the region is defined based on a window around the candidate fixation point; wherein generating maps includes calculating a Z-score for each of a plurality of fixation locations based on a duration corresponding to each location, and associating a color to each Z-score; wherein the maps include one of heat maps, gradient heat maps, and spatially smoothed aggregate maps; further including adjusting the baseline resource based on the one or more statistics of interest by changing one or more characteristics of the baseline resource; wherein the one or more characteristics include one or more of text spacing, font size, font type, font color, margin size, background color, display layout, a relative proportion of displayed content, and image size; wherein the actions further include providing respective resource locators, each resource locator corresponding to one of the baseline resource and the one or more candidate change resources, and retrieving the baseline resource and the one or more candidate change resources using the respective resource locators; wherein the baseline resource includes at least one of a web page, a word processing document, a portable document format (PDF) document, an image, a video and a feed source, and comprises content including at least one of words, phrases, images, graphics, sounds, embedded information and embedded instructions; wherein each of the one or more candidate change resources comprises at least one characteristic that is changed relative to the baseline resource; and processing the one or more statistics of interest to generate one or more predictions, each of the one or more predictions corresponding to an effect that an expected change has on live traffic metrics during user interaction with a resource.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
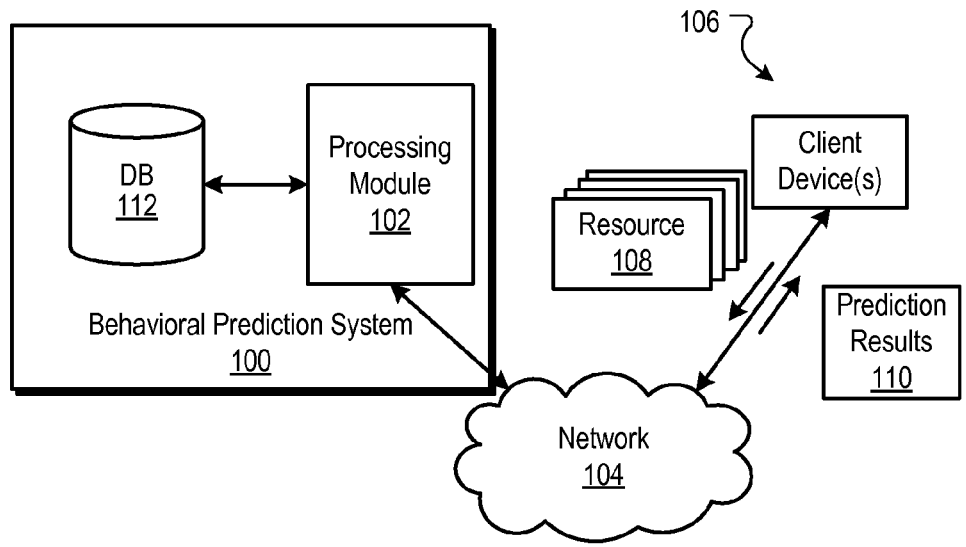
FIG. 1 illustrates an example system architecture including a behavior prediction system having an example processing module.

FIG. 1 illustrates an example system architecture including a behavior prediction system (BPS) 100. The BPS 100 generates and utilizes simulated eye trace data to predict user behavior with respect to a resource 108. Generally, a client device 106 identifies and/or provides resource(s) 108, such as a web page or SERP, and a set of candidate changes, each modifying a visual representation of the resource, to a processing module 102 over a network 104. The network 104 can be provided as a large computer network, such as a local area network (LAN), wide area network (WAN), the Internet, a cellular network, or a combination thereof connecting any number of computing devices. In some implementations, the client device 106 and the BPS 100 can communicate with each other via a virtual private network (VPN), Secure Shell (SSH) tunnel, or other secure network connection. In some implementations, the network 104 can include a wireless service network and may include the Public Switched Telephone Network (PSTN). In some implementations, the network 104 may include a corporate network (e.g., an intranet) and one or more wireless access points.

The client device 106 can provide one or more resources 108 to the BPS 100, and can receive one or more prediction results 110 from the BPS 100 over the network 104. Example client devices 106 include personal computers, mobile communication devices, and other devices that can send and receive data over the network 104. The client device 106 can execute one or more applications (e.g., a web browser) to facilitate sending and receiving of data over the network 104. A resource 108 can include, for example, a web page, a word processing document, a portable document format (PDF) document, an image, a video and/or feed sources. The resource 108 can include content such as words, phrases, images, graphics and sounds, for example, and can include embedded information (e.g., meta information and hyperlinks or "links") and/or embedded instructions (e.g., JavaScript scripts). In some implementations, a resource can be provided as any data that can be provided by a publisher over a network and that can be addressed by a resource address. A resource may, but need not, correspond to an electronic file. A resource may be stored in a portion of a file that holds other resources, in a single file dedicated to the resource in question, or in multiple coordinated files.

The BPS 100 includes a processing module 102 and a database 112. The processing module 102 screens candidate changes by determining patterns of user interaction with a resource 108 and provides metrics corresponding to the changes. In this manner, a developer can select more promising or advantageous changes for further testing using more expensive techniques (e.g., user studies and larger scale web experiments), or for immediate implementation. In some examples, BPS 100 generates a set of candidate changes and identifies particular changes that are deemed to improve one or more specified metrics. The database 112 is coupled to processing module 102. The database 112 stores empirical data collected from usability and laboratory eye tracking studies and distributions derived from that data. Such data can include, for example, saccade distributions and distributions for the total number of saccades in a subject-page-view.

Figure 2:
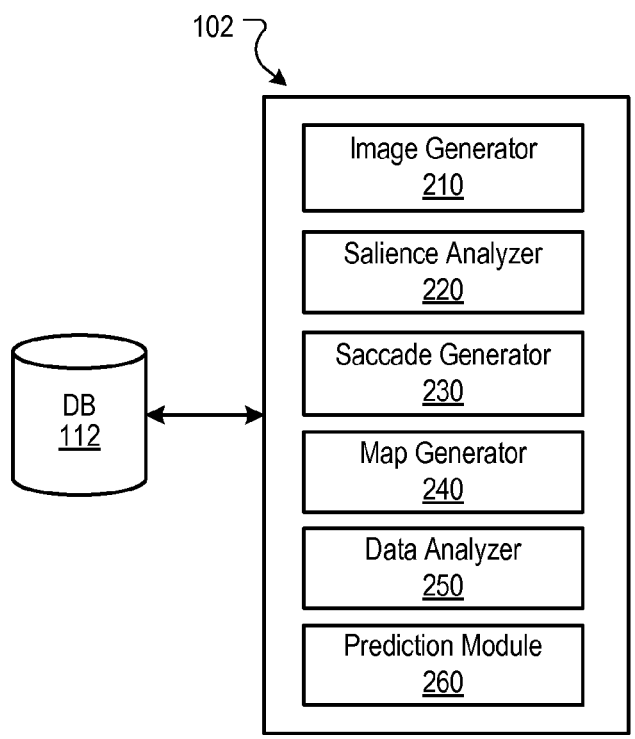
FIG. 2 illustrates details of the example processing module.

FIG. 2 illustrates details of the example processing module 102. The processing module 102 includes an image generator 210, a salience analyzer 220, a saccade generator 230, a heat map generator 240, a data analyzer 250, and a prediction module 260. The image generator 210 receives a resource 108 and one or more variations of the resource 108 and generates corresponding image data. The image generator 210 can include a web browser, for example, for rendering HTML content, an XML/PDF/DOC-to-image converter, or an image capture device. The salience analyzer 220 can be implemented to parse the image data into subcomponents for each color channel (e.g., luminance, red-green, blue-yellow) and across each of a number of spatial scales and/or local filter widths. The salience analyzer 220 can determine salience values for each fixation location, provided as x, y coordinates, of the resource 108. The saccade generator 230 can process the salience values to generate multiple, simulated eye traces across each resource based on a determined number of saccades and a model for selecting saccade vectors.

The map generator 240 compiles simulated eye traces for each resource and generates a two-dimensional (2D) representation of eye movement activity across each version of the resource 108, as described in further detail below. The data analyzer 250 determines statistics of interest based on each of the heat maps, can identify a region of interest within each resource, and provides statistic values to the prediction module 260. The prediction module 260 estimates one or more effects that a candidate change will have on the behavior of a user viewing the resource.

In operation, a prediction model is provided and is based on empirical data that has been collected from usability experiments. The prediction model is used to predict how changes to the visual representation of the resource may affect user behavior with respect to the resource. Changes to the visual representation may include, for example, formatting changes, such as spacing, font size, margin size, font color, and background color, as well as, display layout changes. Changes can also include changes to the relative proportion of the displayed content. Predicted user behavior includes, for example, human eye movement patterns or fixation points (saccades), clicks on objects on the web page, mouse movements and/or key strokes.

In some implementations, the candidate changes can be specified using multiple versions of the resource, each version including the one or more modifications to an original version of the resource. For example, a baseline or original resource can be provided, and one or more candidate change resources can be provided. Each of the one or more candidate change resources includes at least one candidate change to the baseline or original resource.

In some implementations, one or more metrics of interest are identified for use by the BPS to determine additional or alternative candidate changes to the resource, and/or to narrow the analysis to a specified region of interest (ROI). The one or more metrics can be identified by the client device and sent to the BPS. In some implementations, the client device can specify a set of display characteristics that can be varied, such that the combinatoric space (a space considered too larger for human testing) of candidate changes is processed by the BPS to identify candidate changes for further testing. In this manner, potentially useful changes that a developer of the resource might not consider can be discovered and tested.

The baseline resource and the one or more candidate change resources can be identified using a resource locator (e.g., a uniform resource identifier (URI), such as a uniform resource locator (URL)). For example, a client device 106 can provide resource locators to the BPS 100 over the network 104. Using the resource locators, the BPS 100 can access each of the baseline resource 108 and the one or more candidate change resources 108 over the network 104.

Each of the baseline resource 108 and the one or more candidate change resources 108 is retrieved by the BPS 100 and is rendered as an image. Specifically, each retrieved resource 108 is rendered as an image file in a standard image format (e.g., JPG, GIF, PNG, BMP) and includes image data. Salient features are computed for each image for every possible fixation location. A fixation location can be provided as a coordinate pair (x, y) in the two-dimensional (2D) image space. Salient features in the visual field influence eye movement. In view of this, visual salience cues are calculated for each image for use in generating a saliency dependent saccade model. Important visual features for saccades include local contrast (e.g., luminance contrast and/or color contrast), the spatial frequency of targets, and the number and distribution of potential targets. For example, in some implementations, the local contrast is calculated at each location for each image across a number of spatial scales and for each of multiple color channels (e.g., luminance, red-green, blue-yellow). This results in a set of local contrast maps (i.e., one local contrast map for each combination of color channel and local filter width). Local filter width can include a width (e.g., in pixels at half of a maximum height) of the smoothing kernel that is used to filter a contrast map of the image. In some implementations, if a difference of Gaussian kernels is used, a pair of filter widths can be provided.

Using the salience maps, a set of simulated eye movement traces is generated. In particular, a simulated eye movement trace is generated for each salience map. A simulated eye trace includes a sequence of saccades and represents a pseudo-subject's eye movement activity while viewing a resource. Saccade sequences are generated based on salience values within each salience map. The saccades are modeled as near instantaneous point-to-point movements on the image, such that the entire eye trace can be viewed as a sequence of coordinates (e.g., x-y coordinates), where the eye has fixated. Using an x-y coordinate scheme, for example, the x coordinate denotes a horizontal coordinate and the y coordinate denotes a vertical coordinate on the image. A fixation duration (t) is associated with each saccade to represent the variable duration of the fixation for a particular coordinate. Accordingly, a full eye trace is represented by a sequence of vectors $(x_i, y_i, t_i)$, which describe the location and time of the $i^{th}$ saccade in the sequence.

To generate a simulated eye trace, a starting point in the image of a corresponding resource is selected. In some implementations, a starting point can be selected from a known distribution of where viewing tends to begin on a particular type of resource. In some implementations, a starting point can be selected at the top-left or where interesting content may begin (e.g., for resources including right-to-left languages, the starting point can be selected at the top-right). In some implementations, the starting point can be randomly selected.

Once the starting point is selected, the saccade generator, for example, determines the next eye movement or saccade based on a saccade model. A number of saccade models can be used to generate a sequence of saccades. For example, in some implementations, an eye trace model is generated to approximate an empirical saccade distribution collected from a representative set of pages (e.g., from a large set of SERPs, for which real human eye traces have been collected). In some implementations, an eye trace model is generated to approximate a parametric saccade distribution.

In some implementations, simulated eye traces can be generated based on sampling from an empirical distribution. Specifically, a saccade distribution or model can be generated based on available eye trace data (e.g., n subject-page-views of a control resource) by computing a difference between all successive fixations in the data. In some implementations, the saccade distribution can depend on the current location (x, y). Specifically, the empirical distribution can be used over all data points in the same quintile of x and y coordinates. A saccade can be provided as an observed vector $(\Delta x, \Delta y, \Delta t)$ that describes the offset that should be applied to a current fixation point, provided as a saccade vector (x, y, t), to determine the next fixation point. $\hat{F}_n (\Delta x, \Delta y, \Delta t)$ denotes this probability distribution. An empirical distribution for the total number of saccades in a subject-page-view can be derived from that empirical data and is denoted by $\hat{G}_n$. When using such an empirical distribution, $m \sim \hat{G}$ is drawn and the starting fixation point is provided as $(x_0, y_0, t_0)$. $m \sim \hat{G}$ indicates that a random variable m is drawn according to the distribution G. In this case, m denotes the random number of saccades for a given subject-task.

The simulation proceeds for i=1, ..., m. Given that the current fixation point is provided as $(x_{i-1}, y_{i-1}, t_{i-1})$, the next saccade, or fixation point, provided as $(x_i, y_i, t_i)$, is generated by selecting a saccade at random from the empirical saccade distribution $\hat{F}_n$. The selected saccade is applied to the current fixation point to determine a candidate fixation based on the following relationship:

$$(x_i, y_i, t_i)^* = (x_{i-1}, y_{i-1}, t_{i-1}) + (\Delta x, \Delta y, \Delta t)$$

The candidate fixation point is checked for plausibility in view of the visual features near the candidate fixation point. To make this determination, salience maps are implemented. Specifically, a windowing function is calculated in the corresponding salience map around the candidate fixation point, provided as $(x_i, y_i)^*$ and the salience within the window is determined. In some implementations, the salience is calculated by combining local contrast values within the window. The combined salience across all maps is determined to generate a salience score $s(x_i, y_i)^*$ in the region of the candidate fixation point. In some implementations, the salience score is provided as a weighted average or by using other weighting functions.

The candidate fixation point is accepted as the next fixation point or is rejected based on the salience score. In some implementations, the salience score is compared to a threshold salience score. If the salience score is above the threshold salience score, the candidate fixation point is accepted as the next fixation point. If the salience score is below the threshold salience score, the candidate fixation point is rejected, and another candidate fixation point is determined. In some implementations, the determination whether to accept or reject the candidate fixation point is made using a probabilistic sampling method, where the candidate fixation point is accepted with a probability that increases as the salience increases.

If the candidate fixation point is accepted, the current fixation point is set to the candidate fixation point, $(x_i, y_i, t_i) = (x_i, y_i, t_i)^*$. If the current fixation point is rejected, a new candidate fixation point is determined from $\hat{F}_n$. This model is Markovian in the sense that the distribution of $(x_i, y_i, t_i)$ conditional on all past fixations depends only on $(x_{i-1}, y_{i-1}, t_{i-1})$, as well as the salience maps.

In some implementations, simulated eye traces can be generated based on sampling from a parameteric distribution. Specifically, predetermined parametric models are used to reduce the space of possible generating mechanisms and avoid over-fitting to training data. The number of parameters associated with these models is estimated and a holdout set is used to determine the fit of the different model components. Although an example of a first-order Markovian model is provided below, more general models with different parametric and/or non-parametric distributions can be used.

As discussed above, a salience score function (s) is provided such that, for any position (x, y), the quantity s(x, y) provides an average salience in some small neighborhood, or window proximate to the position (x, y). One algorithm for the salience score function can be provided as:

1. Draw a starting point: $(x_0, y_0) \sim F_0$, a mixture of bivariate normals, and set $t_0=0$.
2. Draw $m \sim \text{NegativeBinomial}(r, p)$, the total number of saccades for this pseudo-subject.
3. For $i=1, 2, \ldots, m$:
   (a) Draw $\tau_i \sim \text{Exponential}(\mu_i)$, where $\mu_i$ is a function of $s_{i-1}=s(x_{i-1}, y_{i-1})$, the salience near the current fixation, and set $t_i=t_{i-1}+\tau_i$.
   (b) Draw $(\Delta x, \Delta y) \sim F_i(\Delta x, \Delta y)$, a parametric distribution.
   (c) Draw q Bernoulli(w), where w is proportional to $s(x_{i-1}+\Delta x, y_{i-1}+\Delta y)$.
   (d) If q=1 then set $(x_i, y_i)=s(x_{i-1}+\Delta x, y_{i-1}+\Delta y)$; else return to (b).

where r and p are parameters of the negative binomial distribution, q is a binary/Bernoulli random variable, and r is an exponential random variable. In some implementations, p is greater than zero and less than one (i.e., $0 \leq p \leq 1$) and r is greater than zero (i.e., $r>0$).

The saccade distribution $F_i$ is unspecified, but can be dependent on i and/or on the total time $t_i$ spent viewing the resource. In some implementations, the saccade distribution $F_i$ can be assumed to be independent of i, in which case some type of smoothed cross distribution is appropriate for text-heavy pages with sorted lists (e.g., a SERP). In addition to the Markovian constraint, there subtle assumptions in the model described above. One assumption is that the sequence of saccades $(x_i, y_i, t_i)$; $i=1, \ldots, m$ can be conditionally independent of m. In other words, the distribution of $(x_i, y_i, t_i)$ given $(x_{i-1}, y_{i-1}, t_{i-1})$ does not depend on m provided $i \leq m$. Another assumption is that the distribution of $(x_i, y_i, t_i)$ is also independent of the time the time at which the previous fixation occurred.

Figure 3:
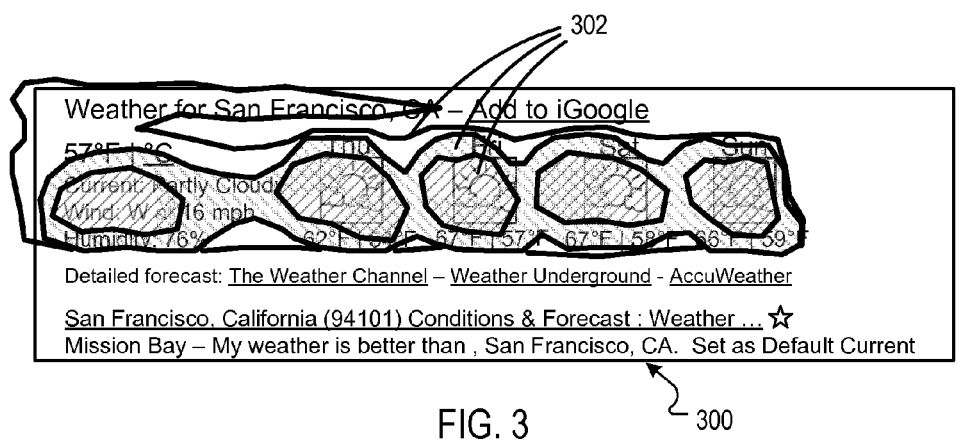
FIG. 3 illustrates an example heat map.

After a set of simulated eye traces has been generated, simulated eye traces are combined to generate one or more maps. The maps can include heat maps or spatially smoothed aggregate maps of eye movement activity. FIG. 3 illustrates an example heat map. The example heat map of FIG. 3 includes a portion 300 of an example SERP and gradients 302 illustrating varying degrees of intensity. A more intense gradient indicates a region in the image that a user may view more often and/or for a longer period of time than a less intense region.

The heat maps can be generated using standard techniques, such as smoothing the fixation points with a Gaussian filter and summing over page views and pseudo-subjects. In some implementations, the heat maps are time-weighted so that fixation points of a longer duration contribute more. In some cases, a difference heat map is computed between experiment (e.g., the one or more candidate change resources) and control (e.g., the baseline resource) to highlight the effect of the candidate changes.

For example, for every point (x, y) in the search space, Z can be calculated as follows:

$$Z(x, y) = \sum_{j \in E}(t_{i+1,j} - t_{i,j})I[(x_{ij}, y_{ij}) = (x, y)] - \sum_{j \in C}(t_{i+1,j} - t_{i,j})I[(x_{ij}, y_{ij}) = (x, y)],$$

where $(x_{ij}, y_{ij}, t_{ij})$ denotes the $i^{th}$ simulated fixation point for the $j^{th}$ pseudo-subject, I is an indicator function, and E and C are an experiment and control set, respectively. Z is provided as a test statistic random field for comparing experiment and control conditions. At each spatial location (x, y), Z(x, y) is provided as a Z-score with approximately a normal distribution. The calculations can be smoothed using a Gaussian kernel (K), and can be normalized for unit variance to provide a heat map of the form:

$$\tilde{Z}(x, y) = \frac{1}{\sigma_N(x, y)}\sum_{s,t} K(x-s, y-t)Z(s, t).$$

In some implementations, the gradient heat maps can be generated. Gradient heat maps provide two-dimensional (2D) vector fields that describe the average rate and direction of movement for fixations at any point in the search space. In gradient heat maps, individual summands for a fixation point $(x_i, y_i, t_i)$ takes the form:

$$(x_i-x_{i-1}, y_i-y_{i-1})/(t_i-t_{i-1}).$$

The maps, data derived from the maps and/or a comparison between the maps (e.g., a baseline map corresponding to a baseline resource and a candidate change map corresponding to a candidate change resource) can be used to extract statistics of interest. Statistics of interest can include, for example, ROI measures, a proportion of activation within a user specified ROI in the resource (e.g., in regions where sponsored links are displayed), the spatial extent of activation, the peak height of activation, and measures of the homogeneity of the activation. Activation can include a set of pixels where a heat map exceeds a threshold or set of thresholds. Spatial extent is provided as a 2D area, or some generalization thereof. Peak height can be provided as the maximum value of the heat map in the particular region. In some implementations, homogeneity of activation refers to a geometric property of the activation region (e.g., such as the number of connected components). In some implementations, homogeneity of activation refers to the correlation structure or other distributional properties of the heat map.

In some implementations, maps can be filtered (e.g., using Gaussian random fields theory) to define a threshold value for use in separating real activation from noise. For example, Gaussian random fields, and other heat maps Z(x, y) derived from them, can be "thresholded" using approximations of the p-value. In some implementations, a p-value approximation can be defined as P[max(Z)>u], for peak height tests, or as P[Area({Z>u})>a], for spacial extent tests, for given thresholds u and a, respectively. These probabilities are computed under a null hypothesis of no signal (e.g., a global mean of zero in the field Z) and make use of the joint distribution of Z and its gradient and hessian processes. These formulae can be adjusted to account for non-zero skewness, kurtosis, and/or higher cumulants of Z.

The statistics of interest can be implemented to estimate or make predictions about an expected change on live traffic metrics. Such live traffic metrics can include, for example, clicks on objects displayed in the resource, mouse movements, key strokes, and engagement with a particular component of the resource (e.g., a side bar, a web link, or other resource content).

The predictions are generated based on a statistical model, M=F(R), where M denotes the live traffic metric(s) of interest and $R=R(Z)=(r_1, r_2, \ldots, r_p)$ are the map statistics of interest. F may be any kind of function, for example a linear model, such that $M=R\beta+\epsilon$, where $\beta$ is a vector or matrix of weights (i.e., M is modeled as a linear combination of the map metrics $r_i$). In some implementations, $\epsilon$ denotes a mean zero random error that can be normally distributed. The model can derived from previously collected data (e.g., data stored in database 112), in which a number of variations of the resource have been tried and live traffic experiments have been performed. In some implementations, usability studies directed to variations of a resource are processed through a subset of modules in the BPS to generate map metrics, $r_i$, and are used to generate a model associating the live traffic metrics with the statistics of interest. In some cases, experiments are devised to create or fine-tune the model using live traffic experiments. In this manner, heat map statistics can be related to live traffic metrics for use in predicting user behavior.

Figure 4:
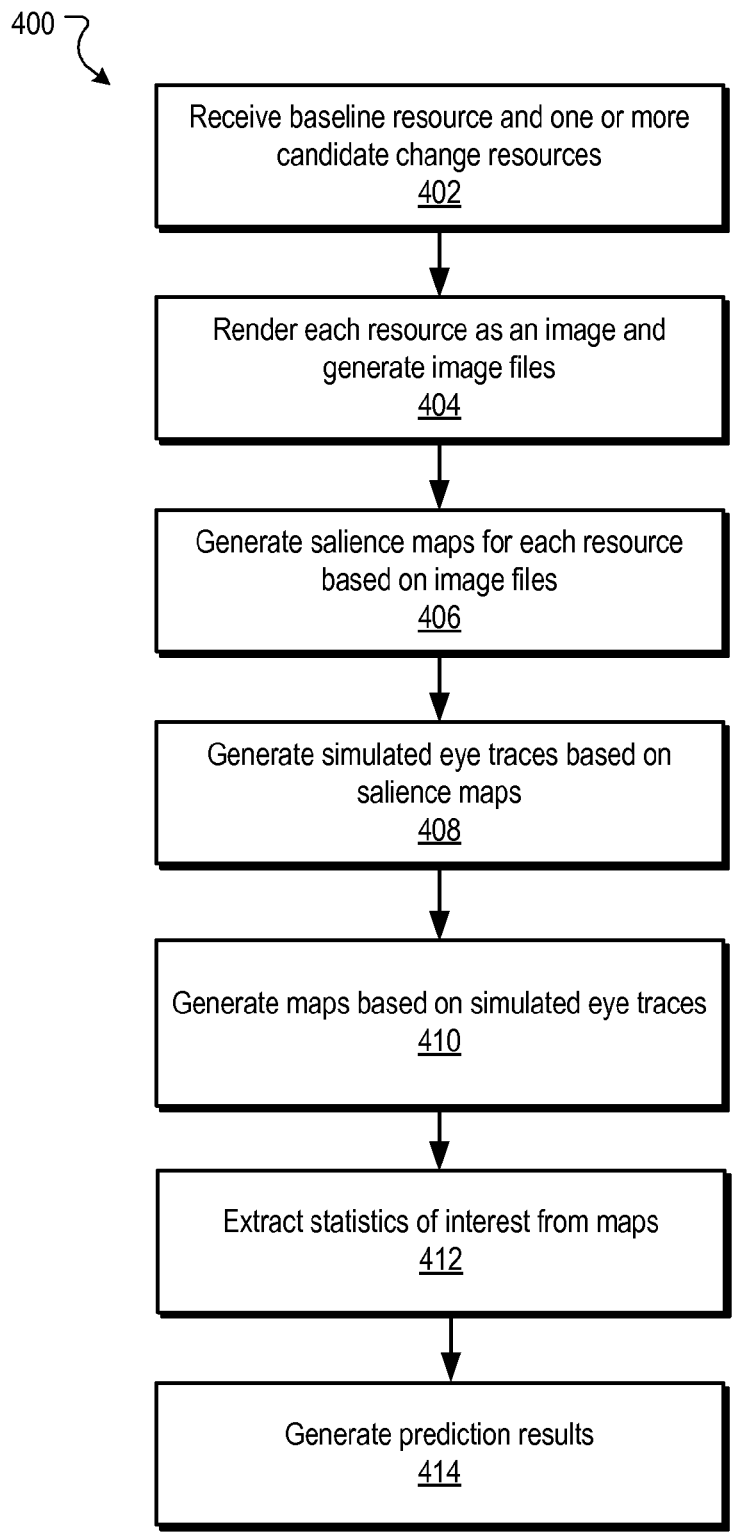
FIG. 4 illustrates an example process for predicting user behavior.

FIG. 4 illustrates an example process 400 for predicting user behavior. The process 400 can be implemented to predict and evaluate user behavior and changes in user behavior based on receiving a set of candidate changes to a resource. The predicted user behavior and/or change in user behavior can be used to estimate an impact on metrics observed across a number of users that will interact with the new format.

An original or baseline resource and one or more candidate change resources are received (402). For example, a BPS, such as the BPS 100 of FIG. 1, receives a resource and one or more candidate change resources from a client device, such as the client device 106. Each of the baseline resource and one or more candidate change resources is displayable on a display. In some implementations, the resource and the one or more candidate change resources can be identified in a request that is received by the BPS. For example, a request can identify the original resource and the one or more candidate change resources using respective a resource identifiers (e.g., a uniform resource identified (URI) such as a uniform resource locator (URL)). As discussed above, the original resource can provide a baseline, to which the candidate change resources can be compared. Example candidate changes can include a format change increasing the spacing between results on a search engine results page (SERP) and/or one or more of the changes specified above (e.g., font size, margin size, etc.).

Each of the original resource and the one or more candidate change resources is rendered as an image and a corresponding image file (e.g., JPG, GIF, PNG, BMP) including image data is generated 404. For example, the image generator 210 of FIG. 2 can render each resource as an image and generate the corresponding image files. The image files are processed to generate a salience map corresponding to each resource (406), the salience maps including features for each fixation location (x, y). For example, the salience analyzer 220 of FIG. 2 can process the image files to generate corresponding salience maps.

The salience maps are processed to generate corresponding simulated eye traces (408), one simulated eye trace for each resource. For example, the saccade generator 230 of FIG. 2 can process each salience map to generate a simulated eye trace for each of the original resource and the one or more candidate change resources. The simulated eye traces are processed to generate heat maps or spatially smoothed aggregate maps (410). For example, the heat map generator 240 of FIG. 2 can process the simulated eye traces to generate the heat maps or spatially smoothed aggregate maps.

The heat maps or spatially smoothed aggregate maps are processed to extract statistics of interest (412). For example, data analyzer 250 of FIG. 2 can process the heat maps or spatially smoothed aggregate maps to extract statistics of interest. The statistics can include, for example, region of interest (ROI) measures, a proportion of activation within a user specified ROI in the resource (e.g., regions where sponsored links are displayed), spatial extent of activation, peak height of activation, and homogeneity of activation. The extracted statistics are processed to generate predictions on the effect that an expected change will have on live traffic metrics (414). Such live traffic metrics can include, for example, clicks on objects displayed in the resource, mouse movements, key strokes, and/or engagement with a particular component of the resource (e.g., a side bar, a web link, or other resource content).

Figure 5:
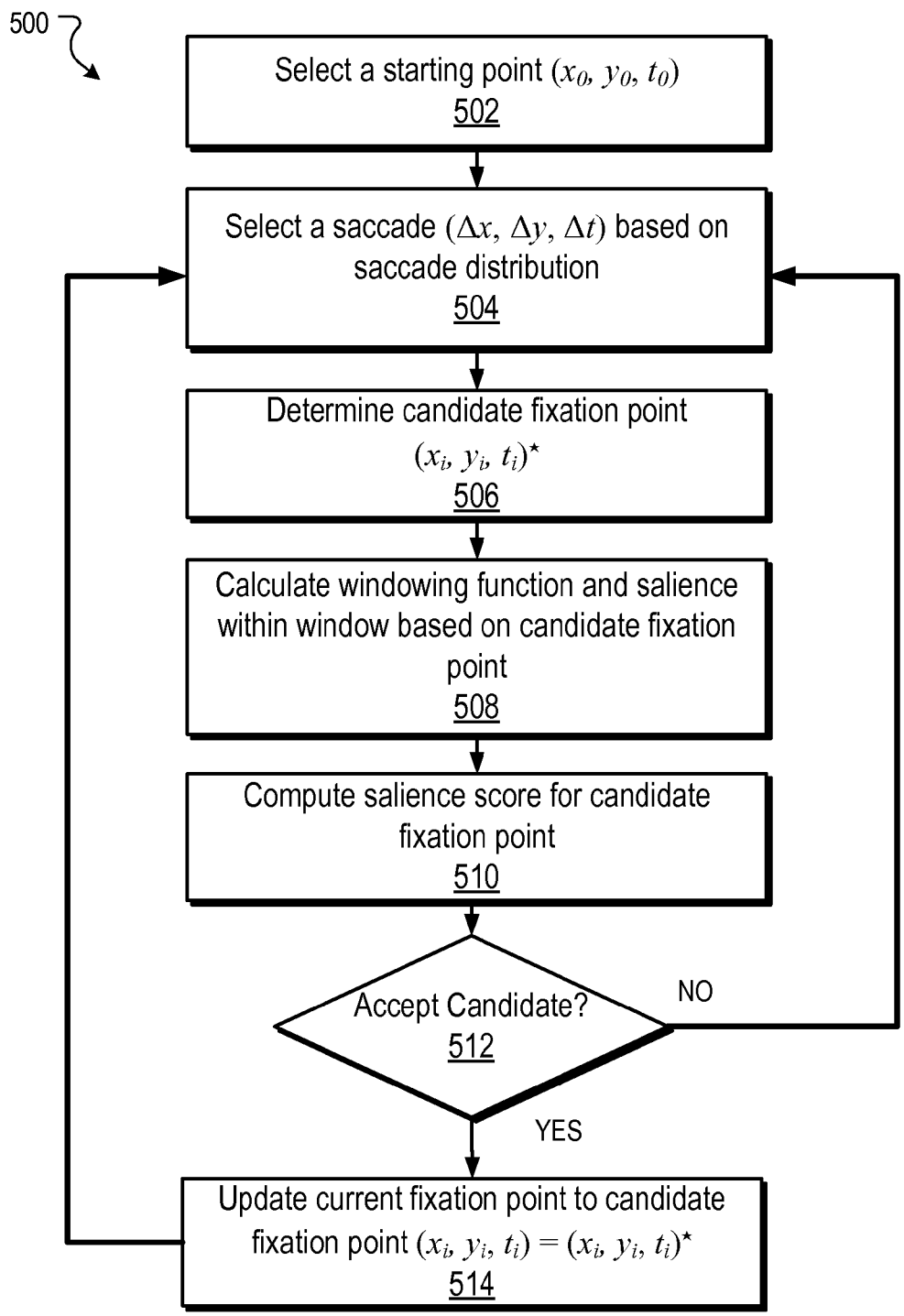
FIG. 5 illustrates an example process for generating simulated eye traces.

FIG. 5 illustrates an example process 500 for generating simulated eye traces. A starting point in each salience map is selected (502). For example, the saccade generator 230 of FIG. 2 selects a starting point from a prior known distribution of where eyes tend to begin on a particular type of resource, at the top-left or where interesting content may begin (e.g., for resources including right-to-left languages, the starting point can be selected at the top-right), or randomly. A saccade is selected based on a provided saccade distribution (504). For example, the saccade generator 230 selects the saccade based on an empirical distribution or a parametric distribution.

A candidate fixation point is determined (506). For example, the saccade generator 230 can randomly select a candidate fixation point from the saccade distribution being implemented. The plausibility of the candidate fixation point is evaluated based on the saliency proximate to the candidate fixation point. For example, a windowing function is implemented to provide a window around the candidate fixation point in the salience maps, and a salience within the window is determined (508). For example, the saccade generator 230 can determine the window and can calculate the salience by combining local contrast values within the window. A combined salience is determined across all of the subject salience maps to generate a salience score in the region of the candidate fixation point (510). For example, the saccade generator 230 generates the salience score in a manner as discussed above. It is determined whether the candidate fixation point is accepted based on this salience score (512). For example, the saccade generator 230 can accept or reject the candidate fixation point by comparing the salience score to a threshold salient score, as discussed above, or using a probabilistic sampling method, where the candidate is accepted with a probability which increases as the salience score increases. If the candidate fixation point is accepted, the candidate fixation point is set to the current fixation point (514), and the process 500 loops back to 504. If the candidate fixation point is not accepted, the candidate fixation point is discarded and the process 500 loops back to 504.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In the specification, for purposes of explanation, specific examples related to evaluating proposed web page design changes have been set forth to provide a thorough understanding of the implementations of the subject matter described. It is appreciated that the implementations described herein can be utilized in other capacities as well and are not limited to web documents. For example, implementations may be used to evaluate printed publication designs for printed material, including, for example, billboards, newspaper articles, sales flyers, restaurant menus, catalogs, packaging, and/or video frames for television commercials, movies, and various other visual media, all broadly provided herein as resources, items, or displays.

What is claimed is:

1. A system comprising:
one or more computing devices; and
a computer-readable medium coupled to the one or more computing devices having instructions stored thereon which, when executed by the one or more computing devices, cause the one or more computing devices to perform operations comprising:

receiving a baseline resource, the baseline resource being displayable on a display;

rendering the baseline resource as an image to provide a baseline image file including corresponding image data;

receiving one or more candidate change resources, each of the one or more candidate change resources including at least one candidate change to the baseline resource, the one or more candidate resources being displayable on the display;

rendering the one or more candidate change resources as respective images to provide one or more candidate change image files each including corresponding image data;

generating salience maps based on the images;

generating simulated eye traces based on the salience maps; and generating additional maps based on the simulated eye traces to determine one or more statistics of interest, the one or more statistics of interest reflecting a user behavior in interacting with a resource.

2. The system of claim 1, wherein generating the salience maps comprises computing a plurality of salient features corresponding to each of a plurality of fixation location targets of each of the images, the computing being based on one or more of a local contrast, a spatial frequency of the targets and a number and distribution of potential targets.

3. The system of claim 1, wherein the simulated eye traces each comprise a sequence of saccades provided as fixation points, each saccade including a coordinate and a fixation duration.

4. The system of claim 1, wherein generating the simulated eye traces comprises:

determining a starting fixation point; and determining a subsequent fixation point based on statistical distribution data, an eye trace being defined between the starting fixation point and the subsequent fixation point.

5. The system of claim 4, wherein the statistical distribution data comprises empirical distribution data.

6. The system of claim 4, wherein the statistical distribution data comprises parametric distribution data.

7. The system of claim 4, wherein the subsequent fixation point is determined based on a salience score within a region of a candidate fixation point, the candidate fixation point being identified as the subsequent fixation point when the salience score is greater than a threshold salience score.

8. The system of claim 7, wherein the region is defined based on a window around the candidate fixation point.

9. The system of claim 1, wherein generating the additional maps comprises calculating a Z-score for each of a plurality of fixation locations based on a duration corresponding to each location, and associating a color to each Z-score.

10. The system of claim 9, wherein the additional maps include one of heat maps, gradient heat maps, and spatially smoothed aggregate maps.

11. The system of claim 1, further comprising adjusting the baseline resource based on the one or more statistics of interest by changing one or more characteristics of the baseline resource.

12. The system of claim 11, wherein the one or more characteristics comprise one or more of text spacing, font size, font type, font color, margin size, background color, display layout, a relative proportion of displayed content, and image size.

13. The system of claim 1, wherein the operations further comprise:

providing respective resource locators, each resource locator corresponding to one of the baseline resource and the one or more candidate change resources; and retrieving the baseline resource and the one or more candidate change resources using the respective resource locators.

14. The system of claim 1, wherein the baseline resource includes at least one of a web page, a word processing document, a portable document format (PDF) document, an image, a video and a feed source, and comprises content including at least one of words, phrases, images, graphics, sounds, embedded information and embedded instructions.

15. The system of claim 1, wherein each of the one or more candidate change resources comprises at least one characteristic that is changed relative to the baseline resource.

16. The system of claim 1, further comprising processing the one or more statistics of interest to generate one or more predictions, each of the one or more predictions corresponding to an effect that an expected change has on live traffic metrics during user interaction with a resource.

17. The system of claim 1, further comprising:

comparing the additional maps that are associated with the one or more candidate change resources with the additional maps that are associated with the baseline resource; and based on the comparison, determining the one or more statistics of interest.

18. A computer storage medium device encoded with a computer program, the program comprising instructions that when executed by data processing apparatus cause the data processing apparatus to perform operations comprising:

receiving a baseline resource at a computing device, the baseline resource being displayable on a display;

rendering the baseline resource as an image to provide a baseline image file including corresponding image data;

receiving one or more candidate change resources at the computing device, each of the one or more candidate change resources including at least one candidate change to the baseline resource, the one or more candidate resources being displayable on the display;

rendering the one or more candidate change resources as respective images to provide one or more candidate change image files each including corresponding image data;

generating salience maps based on the images;

generating simulated eye traces based on the salience maps; and generating additional maps based on the simulated eye traces using the computing device to determine one or more statistics of interest, the one or more statistics of interest reflecting a user behavior in interacting with a resource.

19. A computer-implemented method, comprising:

receiving a baseline resource at a computing device, the baseline resource being displayable on a display;

rendering the baseline resource as an image to provide a baseline image file including corresponding image data;

receiving one or more candidate change resources at the computing device, each of the one or more candidate change resources including at least one candidate change to the baseline resource, the one or more candidate resources being displayable on the display;

rendering the one or more candidate change resources as respective images to provide one or more candidate change image files each including corresponding image data;
generating salience maps based on the images;
generating simulated eye traces based on the salience maps; and
generating additional maps based on the simulated eye traces using the computing device to determine one or more statistics of interest, the one or more statistics of interest reflecting a user behavior in interacting with a resource.

* * * * *

UNITED STATES PATENT AND TRADEMARK OFFICE
CERTIFICATE OF CORRECTION

PATENT NO. : 8,487,959 B1
APPLICATION NO. : 12/852173
DATED : July 16, 2013
INVENTOR(S) : Rehan Khan It is certified that error appears in the above-identified patent and that said Letters Patent is hereby corrected as shown below:

Title Page, column 2 (Other Publications), entry 3, line 1, delete "Interffing" and insert
    -- Inferring --, therefor.

Signed and Sealed this
Fifteenth Day of October, 2013

Teresa Stanek Rea
*Deputy Director of the United States Patent and Trademark Office*